United States Patent

Coman

[15] 3,641,392
[45] Feb. 8, 1972

[54] ELECTRICAL DEMAND PRIORITY CIRCUIT

[72] Inventor: William E. Coman, Newport, N.Y.
[73] Assignee: The Bendix Corporation
[22] Filed: Mar. 23, 1970
[21] Appl. No.: 21,568

[52] U.S. Cl..................317/13 R, 317/18 R, 317/33 VR, 323/15
[51] Int. Cl. .......................................................H02h 7/09
[58] Field of Search...........323/15; 317/13, 18, 31, 33 VR; 307/66, 86, 87, 48, 85, 19, 20, 29, 52

[56] References Cited

UNITED STATES PATENTS

| | | | |
|---|---|---|---|
| 3,374,424 | 3/1968 | Wiechmann | 323/22 T |
| 3,041,465 | 6/1962 | Ayre | 307/87 X |
| 3,049,623 | 8/1962 | Du Vall | 307/66 UX |
| 3,123,759 | 3/1964 | Grey | 307/48 UX |
| 3,267,288 | 8/1966 | Maiden et al. | 307/66 |

*Primary Examiner*—D. F. Duggan
*Assistant Examiner*—Harry E. Moose, Jr.
*Attorney*—Robert A. Benziger and Plante, Arens, Hartz, Smith and Thompson

[57] ABSTRACT

A circuit for controlling the provision of electrical energy to an accessory circuit in accordance with an established priority and the energy demands placed upon the remainder of the system by the other accessories powered therefrom is disclosed herein. The circuit includes a control transistor which provides an electrical interconnection between the vehicle bus bar and the accessory and its accessory battery. When the demands placed upon the remainder of the electrical circuit are high the control transistor limits or terminates the flow of energy to the high demand accessory portion of the circuit.

4 Claims, 2 Drawing Figures

PATENTED FEB 8 1972      3,641,392

WILLIAM E. COMAN
    INVENTOR.

BY *Robert A. Benziger*

ELECTRICAL DEMAND PRIORITY CIRCUIT

BACKGROUND OF THE INVENTION

1 Field of the Invention

The present invention is related in general to energy transfer systems and in particular to systems for transferring energy in accord with established priorities of operation.

p 2 Summary of the Prior Art

The prior art in general shows circuits for regulating the supply of energy to a device which may be, for instance, a battery in response to electrical or physical parameters of the device itself. For instance, the normal accessory supply circuits respond to the need of the accessory while the battery charge regulating circuits of the prior art control the application of current and/or voltage to a battery in response to the voltage level to which the battery, or any or all of its cells, has been charged, by the current being drawn by the battery, by the temperature of the battery or its environment, or by any factor affecting the use or life of the battery. However, this type of energy supply regulator is not suitable for use in situations where the status of the battery, or device being supplied, is of secondary, or lesser, importance during a portion of its operational cycle. It is, therefore, an object of the present invention to provide an energy supply control circuit for a device capable of recognizing and reacting to electrical priorities other than those of the device itself. It is a still further object of the present invention to provide a control circuit which controls the application of electrical energy to an accessory circuit in response to the availability of such electrical energy. It is a specific object of the present invention to provide an electrical control circuit which provides electrical energy to an accessory circuit, which may include a rechargeable battery, which provides such energy in response to the need of the accessory circuit for energy but which is responsive to the overriding priorities for such energy as established by the condition of variable parameters of the energy source. It is a still further object of the present invention to provide a control having the above-enumerated objects and advantages which is further operative to provide said energy in response to a preestablished maximum limitation.

SUMMARY OF THE INVENTION

With the proliferation of electrically powered accessory equipment for single-engine and rotary wing aircraft, such as the wide variety of radio equipment, radars, and the like which may be used intermittently, the need has developed for an electrical energy priority-recognizing control circuit which will provide power to nonessential accessories only when sufficient power is available and which will otherwise terminate or open-circuit the electrical connection between the accessory circuit and the main electrical energy source. In such systems where the accessory must nevertheless be available for use when the circuit connection is terminated, a battery source may be made available. Such a control circuit must, therefore, be capable of providing charging current for the battery whenever possible. In addition, some accessories require current in excess of that available within the system under the most favorable circumstances so that rather than completely rebuilding and rewiring existing installations, it has also become necessary to provide a circuit for interconnecting a plurality of current sources, at least one of which may be a battery, to provide a high output current and to additionally recharge the battery when necessary. To meet the above-noted objectives and requirements, the present invention provides a pair of parallel current sources, one battery, the other derived from an available voltage source, arranged to power an output device or accessory. Since the accessory may have high current demand and can be expected to be only intermittently necessary, the battery is arranged to be charged from the other available voltage source whenever possible by a control circuit which is comprised of a control transistor biased into conduction by a bias control which will vary the conduction of the control transistor whenever the available voltage drops below a predetermined value or when the current demanded by the accessory circuit (demand current) is too great.

DETAILED DESCRIPTION OF THE PRESENT EMBODIMENT

Figure 2:
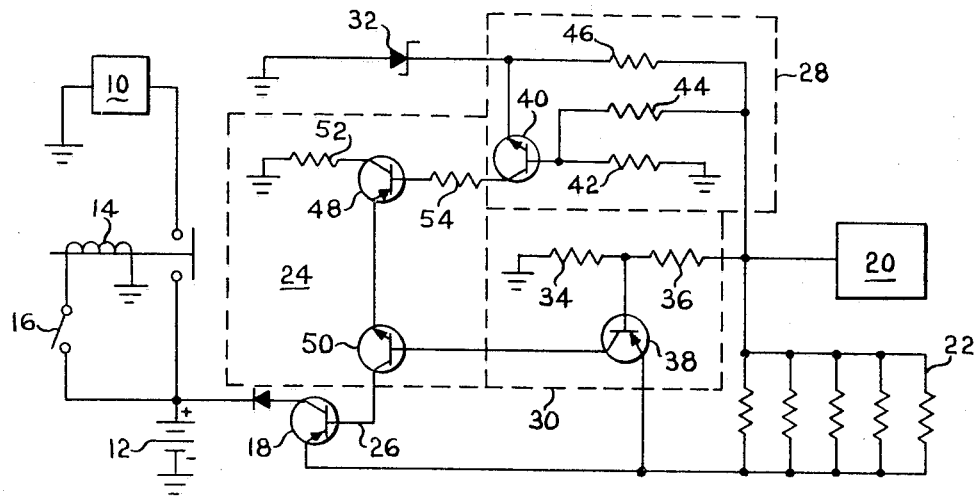
FIG. 2 shows the preferred electrical schematic of the FIG. 1 circuit.

My circuit will first be described with reference to the block diagram of FIG. 1. An accessory device 10, which may be a motor, a pump or any other electrical device, is adapted to be energized, actuated, or powered as the case may be, from battery 12 through relay switch 14. The relay 14 may also be energized by battery 12 upon closure of switch 16. The battery is shown as being connected in a negative ground configuration but the man of ordinary skill in the art will recognize that positive ground configurations are possible and such would only require reversal of the polarity sensitive portions and elements of the system to be described hereinbelow. Switches 14 and 16 are shown as being electromechanical and mechanical in nature but may be any suitable form of switch such as mechanical, electromechanical, electrical or solid-state electronic.

The collector of the control transistor 18 is connected to the positive (nonground) terminal of battery 12 and has its emitter connected to an energy source 20, in the form of a voltage supply, through resistance means 22. The energy source 20 is expected to have a variable characteristic. In the case of electrical energy supplies, this characteristic may be the voltage, current or power which the source may provide. In this instance, and for purposes of example, energy supply 20 is a voltage supply whose voltage level may vary due to external usage factors. The present arrangement is so adapted that energy source 20 will be a parallel source of electrical energy, along with battery 12, for the accessory device 10 whenever the transistor 18 is in the "on, " or conduction state. Furthermore, the amount of current which flows from energy source 20 through the collector of control transistor 18 will be a function of the degree or extent of the conduction of transistor 18 and the voltage at the positive (nonground) terminal of battery 12. Thus, whenever transistor 18 is conducting, current will be available from voltage supply 20 to power or energize accessory device 10 and/or to charge the battery 12 up to its rated voltage and the degree of intercommunication between voltage supply 20 and device 10 will be controllably variable.

The control supervisory means 24 is connected to the base terminal 26 of transistor 18 and is adapted to supervise (i.e., selectively control) the application of a bias voltage to the base terminal 26 to supervise control transistor 18 in accord with the availability of electrical energy from the voltage supply 20, and the current flow from supply 20 to the emitter of transistor 18. The voltage applied to terminal 26 will then bias this terminal with respect to the voltage at the emitter of the transistor 18 (i.e., the positive terminal voltage of source 20). The available electrical energy of voltage supply 20 will be indicated by sampling means 28 monitoring the variable condition, in this instance the voltage, and current flow (demand current) will be sampled by energy transfer means 30 measuring voltage drop across resistance means 22. Zener diode 32, having its cathode connected to the sampling means 28, provides the reference against which the voltage of the supply 20 is to be compared.

Figure 1:
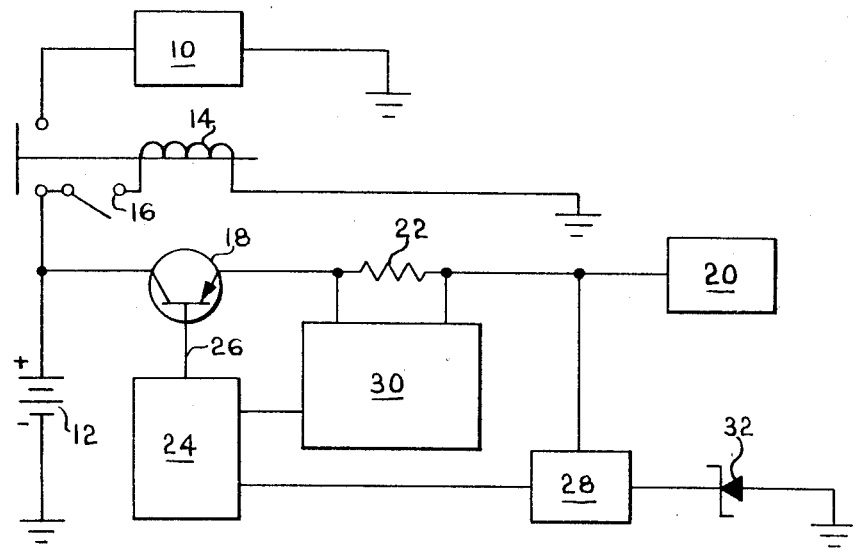
FIG. 1 shows a schematic circuit, partially in block diagram form, of the present invention.

Referring now to FIG. 2, the block diagram of FIG. 1 has been expanded to include electrical components which will accomplish the various functions ascribed to each block. This portion of the description will, therefore, be limited to descriptions of the electrical components which comprise the control supervisory means 24, the sampling means 28 and the energy transfer means 30.

The energy transfer means 30 is illustrated as a current measuring circuit and is comprised of a pair of resistance 34, 36 in series connection between the voltage supply 20 and the common or ground, and a transistor 38. The base of transistor 38 is connected between the series resistance 34, 36 while the emitter thereof is connected to the low voltage side of the resistance means 22. The collector of the transistor 38 is connected to the control supervisory means 24 in a fashion to be described hereinbelow.

The sampling means 28 is comprised of transistor 40 and resistance means 42, 44 and 46 and compares the available voltage of supply 20 against a reference. Resistance means 42, 44 are arranged in series connection between the voltage supply 20 and ground, and the base of transistor 40 is connected between the series connected resistance means 42, 44. Resistance means 46 is in series connection between the cathode of zener diode 32 and the voltage supply 20 and the emitter of transistor 40 is connected to the cathode of zener diode 32 so that the potential of the emitter of transistor 40 will remain at a constant value for large variations in the supply voltage. The collector of transistor 40 is connected to the bias control in a fashion to be described hereinbelow.

The supervisory control 24 is comprised of a pair of transistors 48, 50 and resistance means 52, 54. The collector of transistor 48 is connected to ground through resistance 52 and the base of transistor 48 is connected to resistor 54 which, in turn, is connector of transistor 40 in the sampling means 28. The emitter of transistor 48 is connected to the emitter of transistor 50. The base of transistor 50 is connected to the collector of transistor 38 in the current limiting means 30 and the collector of transistor 50 is connected to the base of control transistor 26.

The circuit of my invention operates as follows. Upon determination that it is desirous to operate electrical device 10, switch 16 may be closed in any suitable fashion. This switch closure will energize relay switch 14 and will provide a completed circuit between battery 12 and device 10. The emitter of transistor 18 will be at an elevated voltage, substantially that of the voltage supply 20, and the collector of transistor 18 will also be at an elevated voltage. Depending on the various voltage levels at the emitter, base, and collector of transistor 18, the transistor may be biased in the nonconducting (or "off") region, or may be conducting at any degree through the active region up to complete saturation. Any current flowing through the transistor 18 to the collector thereof will add to the current being supplied by the battery 12 to device 10 (or, if relay switch 14 is open, will serve to charge the battery). The exact effect may be readily tailored to suit the existing needs of the system and such tailoring is well within the skill of the man or ordinary skill in the art. For the remainder of the description, a particular set of operating conditions will be presumed to exist but it should be recognized that my invention does not depend on the specific conditions assumed, but rather on the generalized conditions specified hereinbelow. Device 10 is known to require, in its operation, an established level of supplied current and the operation of device 10 is assumed to be nonessential to the operation of other components and systems connected to or with voltage supply 20. Furthermore, operation of device 10 is considered to be detrimental to the system if the voltage at supply 20 is depressed below a preselected level or if the energy (in the form of electrical current at the supply voltage) being drawn from the voltage supply 20 by device 10 exceeds a preselected value. The two above-noted preselected values are determined such that other systems or components connected to, or powered by, supply 20 will not be jeopardized by operation of device 10. If desired, device 10 may be provided with an internal energy source, battery 12, if operation of device 10 is deemed of sufficient importance to warrant a separate supply. In the described embodiment, such additional supply is considered desirable and is connected to permit recharging from supply 20 whenever necessary and possible. The use of battery 12 is a specific operating condition presumed to exist in addition to the above generalized conditions.

In all instances where the voltage at the collector of transistor 18 is below the voltage of the emitter of transistor 18, and the voltage at base 26 is less than the voltage at the emitter of the transistor 18, the transistor will be conducting and current will flow from supply 20 through resistance network 22, through the emitter of transistor 18 to the base 26 and the collector of transistor 18. From the collector of transistor 18, the current will flow to the device 10 through switch 14, if energized, or the battery 12. In the first case, this current will add to the battery-supplied current in energizing device 10; in the second case, the current will flow into the battery 12 and battery 12 will be recharged.

The amount of current provided by supply 20 to the collector of transistor 18 will be controlled by the voltage potential at the base 26 of transistor 18. This potential will be determined by the current flow from the emitter of transistor 18 to the base 26 and into the supervisory control 24. This current, and thus the potential at base 26, will be determined by the impedances present in transistors 48 and 50 as well as the voltage drop across the resistance 52. If the effective impedances of transistors 48 and 50 are low, the current drawn through the emitter-base junction of transistor 18 will be relatively high and the current in the collector of transistor 18 will also be high, thereby supplying a maximized portion of current of device 10 (or battery charging current).

As the total current flowing through the emitter terminal of transistor 18 increases, the increased voltage drop across resistances 22 will decrease the difference in potential between the emitter and base junctions of transistor 38. This will cause the voltage at the collector of transistor 38 (and at the base of transistor 50) to drop, thereby increasing the effective impedance of transistor 50 so that the total current flowing into the emitter of transistor 18 will be reduced. The energy transfer means 30 can thereby regulate the amount of current being drawn from supply 20 to assist in powering device 10 or recharging battery 12. In order to provide the desired degree of regulation consistent with the priority assigned to the device 10 in relation to other demands placed upon the supply 20, the resistance 22, 34 and 36 may be of selected values such that the voltage between resistors 34 and 36 and the voltage drop across resistance 22 controllably varies the potential between the emitter and base of transistor 38.

Sampler means 28 is operative to permit supply 20 to provide current to the collector of transistor 18 until the overall demand on supply 20 decreases its output voltage below a selected value. Zener diode 32, in series connection with resistance 46 between ground and the voltage supply, is operative to establish a fixed potential at the emitter of transistor 40. The base of transistor 40 is connected to the voltage divider comprised of resistances 42 and 44 such that the potential at the base of transistor 40 will be a percentage of the supply voltage. While the supply voltage remains above the preselected minimum value, transistor 40 will be in the conducting state and a signal will be applied through the collector of transistor 40 and resistance 54 to the base of transistor 48. This signal will bias transistor 48 into conduction permitting the bias control current to flow through the transistor 48 and resistance 52 to ground. By proper selection of the voltage divider values, the transistor 40 can be arranged to turn "off" when the voltage of supply 20 drops below a selected value. Removal of the signal from the base of transistor 48 will cause it to go to the "off" state and the bias control current will be prevented from flowing, thereby causing the control transistor 18 to be in the nonconducting state. This will, therefore, prevent device 10 from drawing energy from supply 20 at such times when supply 20 is heavily relied upon by other devices, systems or components.

I claim:

1. An electrical energy supply regulating system for controlling the provision of energy from a voltage source having a variable output characteristic to a device comprising:
   intercommunication means for intercommunicating the source of energy with the device including control means operative to selectively vary the degree of the intercommunication;
   control supervisory means coupled to said control means responsive to the variable condition of the source operative to supervise said control means to thereby regulate the degree of the intercommunication;
   reference means for establishing a reference voltage level;
   sampling means operative to compare the voltage level against the reference voltage; and
   said control supervisory means are responsive to said sampling means comparison and are operative to terminate intercommunication whenever the supply voltage drops below the level established by said reference means.

2. The system as claimed in claim 1 wherein said reference means are a zener diode and said sampling means comprise;
   a transistor having its emitter connected to the zener diode; and
   voltage divider means interconnecting the base of the transistor to the supply and ground, operative to provide the base of said transistor with a voltage which is a predetermined fraction of said variable voltage level;
   said transistor operative to provide a signal at its collector whenever the fractional voltage applied to the base of the transistor exceeds the reference voltage.

3. An electrical energy supply regulating system for controlling the provision of energy from a voltage source having a variable output characteristic to a device comprising:
   intercommunication means for intercommunicating the source of energy with the device including control means operative to selectively vary the degree of the intercommunication;
   control supervisory means coupled to said control means responsive to the variable condition of the source operative to supervise said control means to thereby regulate the degree of the intercommunication and including further;
   limiting means comprising energy transfer measuring means responsive to the degree of the intercommunication operative to indicate the amount of electrical energy being supplied from the source to the device and to limit the degree to a predetermined maximum value; and
   the control means are responsive to the indication from said energy transfer measuring means of the electrical energy flow to vary the degree of the intercommunication between the source and the device and further operative to substantially terminate said intercommunication in response to the amount of electrical energy being supplied from the source exceeding a predetermined value.

4. The system as claimed in claim 3 wherein the source of electrical energy is a voltage source and the variable characteristic is the voltage level of the source and including further:
   reference means for establishing a reference voltage level;
   sampling means operative to compare the voltage level against the reference voltage; and
   said control supervisory means are responsive to said sampling means comparison and are operative to terminate intercommunication whenever the supply voltage drops below the level established by said reference means.

* * * * *